United States Patent [19]

Brink, deceased

[11] 3,871,132

[45] Mar. 18, 1975

[54] SEED TABLET

[75] Inventor: Edwin H. Brink, deceased, late of Joilet, Ill., by Robert R. Brink, Administrator

[73] Assignee: FMC Corporation, San Jose, Calif.

[22] Filed: Aug. 20, 1973

[21] Appl. No.: 389,761

[52] U.S. Cl. ................................. 47/57.6
[51] Int. Cl. ............................... A01c 1/06
[58] Field of Search ............ 117/3; 47/57.6, DIG. 9

[56] References Cited
UNITED STATES PATENTS

| | | | |
|---|---|---|---|
| 2,553,577 | 5/1951 | Hale et al. | 47/57.6 |
| 2,967,376 | 1/1961 | Scott | 47/57.6 |
| 3,555,730 | 1/1971 | Brink | 47/57.6 |
| 3,648,409 | 3/1972 | Johnson et al. | 47/57.6 |
| 3,690,034 | 9/1972 | Knapp | 47/57.6 |
| 3,703,404 | 11/1972 | Kirk | 47/57.6 X |

*Primary Examiner*—Robert E. Bagwill
*Attorney, Agent, or Firm*—R. S. Kelly

[57] ABSTRACT

A seed tablet comprised of one or more seeds encased in a mixture of vermiculite and a dextrin binder having a pH value of about 3. In forming the tablet the binder material is cooked with water and the resulting solution is thoroughly mixed with the dry vermiculite with the vermiculite-binder-water ratio in the mix being about 20-1-3. The tablets are then formed by placing a seed or seeds within the mixture in a die and compressing it into a rigid cylindrical tablet with a compression ratio of 3 1/2-1. Finally, the tablet is dried to reduce the moisture content to the equilibrium level of about 2% whereby the tablet can be readily handled by mechanical equipment without damage thereto.

1 Claim, No Drawings

SEED TABLET

BACKGROUND OF THE INVENTION

1. Field of the Invention

The present invention pertains to methods and means of packaging seeds for precision planting purposes, and more particularly, it pertains to seed-containing tablets wherein one or more seeds are contained within a tablet formed of compressed centicrustant seedbed material.

2. Description of the Prior Art

In recent years, due to the scarcity and rapidly increasing costs of farm labor, attention has been turned to means and methods for precision planting in order to reduce or eliminate the need for hand thinning of the plants and in order to increase the yield. Some methods and means for accomplishing such precision planting include the use of coated seeds, the singulation and precision locating of individual seeds at predetermined spacings, and the use of seed tapes wherein seeds are implanted in a destructable tape at uniformly spaced intervals. Recently, however, a great deal of attention has been turned to the production of seed tablets. These tablets typically comprise cylindrical wafers of about ½ to ¾ inches in diameter formed of an anticrustant seedbed material, such as vermiculite, which is compressed about one or more seeds. The tablets, after compression, are rigid enough so that they can be handled by automatic planting machinery without disintegrating. The tablets are adapted to be placed at predetermined intervals in the field either with the flat side of the tablet being flush with the ground surface or with one edge thereof being flush with the ground surface depending upon the nature of the seed contained in the tablet.

The history and prior formulations of such seed tablets have been described by Bill L. Harriott in the Transactions of the American Society of Agricultural Engineers, Volume 13, No. 5, pages 550–553 (1970) and by William R. DeTar and Paul E. Johnson in Paper No. 71-102 presented at the 1971 Annual Meeting of the American Society of Agricultural Engineers at Pullman, Washington. Generally, the tablets or wafers which have been produced heretofore have been comprised of an anticrustant seedbed material, such as vermiculite, to which is added small quantities of water plus a binder. These ingredients are thoroughly mixed, and the resulting wet mixture is compressed in conventional dies to form tablets with the compression ratio being generally in the range of from 4-1 to 6-1 or higher.

It has been discovered that certain additives may be used in the tablets in order to increase the resistance of the tablets to destruction by preemergence herbicides and to increase the percentage of plant emergence. For example, the U.S. Pat. No. 3,648,409 to Johnson describes a seed tablet comprised of a vermiculite material with a liquid fertilizer (polyphosphate) binder wherein activated carbon granules were added to the mixture to absorb any pre-emergence herbicides in the soil where the tablets are planted. Johnson uses a tablet formulation of about 0.1 ml of binder to 1.5 grams of vermiculite-carbon mix.

My prior U.S. Pat. No. 3,555,730 describes a seed tablet comprised of vermiculite with a polyvinyl acetate binder wherein the tablet is formed in a die at compression ratio of between 4-1 and 6-1.

The U.S. Pat. No. 3,284,209 to Kelly describes a seed tablet wherein a thermoplastic binder, vermiculite and water (5% by weight) are compressed at 75 p.s.i. or better in order to form rigid seed tablets.

It has generally been recognized that it is necessary to limit the amount of compression which is used to form the tablets in order to obtain the necessary high percentage of plant emergence from the tablets. At the higher compression ratios the encased seed may be damaged and, in any case, plant growth is temporarily retarded when the material directly adjacent to the germinating seed is highly compressed. At the lower compression ratios, however, it is difficult to form a seed tablet which is able to be handled with the presently available mechanical handling and planting equipment without disintegrating or otherwise becoming damaged so as to destroy its effectiveness. Consequently, there has been a continuing need to find a seed tablet composition which will be capable of being formed with a lower compression ratio than that previously used but which will provide a high strength tablet capable of being handled by commercially available planting equipment. Such a seed tablet must, of course, also possess a high degree of reliability with regard to plant emergence.

SUMMARY OF THE INVENTION

I have discovered that the amount of and the nature of the binder material used in gluing the vermiculite (or other compressive seedbed material) together is critical to both providing a tablet having high strength for subsequent mechanical handling and insuring a high likelihood of plant emergence. Furthermore, I have discovered that the amount of water used in the initial tablet mix prior to the compression thereof and its relationship to the other materials in the tablet is important, and its careful selection will permit a lesser amount of compression to be used in forming the tablet than has heretofore been used thereby further increasing the likelihood of plant emergence.

The tablet of the present invention is formed from a mixture of vermiculite, a water soluble nutrient binder, and water with the ratio of vermiculite to binder being about 20-1 and the ratio of vermiculite and binder to water being approximately 7-1. This mixture is compressed by a factor of no greater than 3 1/2-1 to form a rigid tablet which will have good handling qualities once it is dried to an equilibrium moisture content of about 2%.

An important feature of the present invention is the nature of the binder material used. It has been found that a dextrin binder having a low pH value of about 4 or less has a significant effect upon the percentage of plant emergence. This dextrin binder material has been found to increase the speed of and likelihood of plant emergence as compared with the conventional polyvinyl acetate and starch binder materials.

DESCRIPTION OF THE PREFERRED EMBODIMENT

In accordance with the present invention a number of seed-containing tablets were prepared with each tablet having the form of a cylinder three-quarters of an inch in diameter and one-quarter of an inch thick. Each tablet was comprised of exfoliated vermiculite, a dextrin binder and a sufficient amount of moisture. In the preferred embodiment of the invention the materials are mixed in the following proportions: 20 parts of vermiculite, 1 part binder, and 3 parts water. A vermiculite material which was found to be suitable for use in the seed tablets of the present invention is a grade 4 expanded vermiculite, which is made by the Zonolite Division of W. R. Grace Company, Chicago, Ill. and has a particle size such that all of it will pass through a 10 mesh screen and 90% of it will be caught on a 100 mesh screen. The preferred binder material is a low viscosity pyro dextrin known as Nadex 771 which is manufactured by the National Starch and Chemical Corporation, New York, N.Y. This dextrin material has a pH value of approximately 3.1, is at least 97% soluble in water, and has the characteristic remoistening properties and stability of a fully converted corn dextrin.

In forming the tablets of the present invention, the powder binder material is placed in water in an approximate ratio by weight of 3 parts water to 1 part binder, and cooked therewith for approximately 10 minutes at 185°F. The resulting solution is thereafter allowed to cool. The loose, dry vermiculite is put into a continuous tumbler device, such as a conventional cement mixer, and the binder solution is sprayed in under pressure while the vermiculite is continuously tumbled in order to provide a thorough mixing. This wet material is then immediately conveyed into hoppers where it is deposited into the tablet forming dies of a tablet making machine.

The preferred machinery for making the tablets of the present invention is disclosed in a co-pending application of Robert K. Houston and Donald W. Irving, filed on or about Aug. 9, 1973, which is assigned to the assignee of the present invention and entitled Press for Forming One-Piece Tablet Containing Seeds or the Like, Attorney's Docket No. SJ 6754. The machine disclosed in this patent application, the details of which are not critical to an understanding of the present invention, generally comprises a plurality of pairs of opposed punches each of which act cooperatively upon a deposit of material in a die so as to compress the same and form a solid cylindrical tablet. In accordance with the method of making the present tablet, a charge of one-half of the material necessary for forming a tablet is placed in a die. A single seed (or predetermined number of seeds) is then dropped on top of the half-charge. A second charge is placed on top of the seed and the first charge, and the entire contents of the die is then compressed between the opposed punches. In accordance with the teachings of the present invention, the compression ratio, i.e., the reduction in volume of the original material, should not be greater than about 3 1/2-1.

After a variable holding time, depending upon the number of tablets being processed in a single batch, the tablets are placed in a more or less conventional forced air dryer operating at a temperature of around 90°F. with a humidity of less than 5%. The tablets are dried until the moisture content thereof is reduced to around 2%; this normally requires 30 minutes to 1 hour. This moisture content is the moisture equilibrium level of a tablet, and, under normal ambient conditions, the tablet will retain such moisture for an indeterminate period of time thereby preventing the seed contained in the center thereof from drying out and dying.

Tests were conducted in order to determine whether or not the selection of binder material for the seed tablet had any effect with regard to plant emergence. The aforedescribed tablet formulation was used to form a first group of test tablets which was compared with a second group of test tablets using exactly the same formulation except that a polyvinyl acetate binder material was substituted for the aforementioned dextrin binder material. A third group of tablets was formed in which the amount of polyvinyl acetate binder in the second group was doubled, all other contents and quantities remaining the same. Finally, a fourth group of tablets was formed as in the first group, except that the amount of dextrin binder contained therein was doubled. The tablets were produced using standard mixing procedures and a 3 1/2-1 compression ratio. All of the tablets contained a single seed of the Calmar variety of lettuce. The tablets were planted in flats in a greenhouse under controlled environment conditions with five replicates being planted of each of the tablets having different binder formulations. With watering being performed every third day, the results showed a significantly better percentage of plant emergence with those tablets having the dextrin binder than with those tablets having the polyvinyl acetate binder. This difference was particularly accentuated in the early readings beginning on the fourth day after planting wherein it was seen that the dextrin binder clearly contributed to a more rapid development of the plants. While the increased amounts of dextrin binder did not show any appreciable change in the plant emergence results, the increased amount of polyvinyl acetate binder appeared to have a phytotoxic effect upon the seeds.

A second series of tests was conducted to determine the effectiveness of the particular dextrin binder with the low (3.1) pH value as compared with other dextrin binders and of higher pH. The various binder materials tested were the aforedescribed Nadax 771 with a pH of 3.1, a Nadex 791 (National Starch and Chemical Corporation) dextrin binder having a pH of 3.1, an Anioca dextrin with a pH of 5.0, a tapioca dextrin (Crystal Gum-National Starch and Chemical Corporation) having a pH of approximately 4.0, a borated dextrin (Aqua Flakes-National Starch and Chemical) having a pH of 8.6, and another borated dextrin (Aqua Flakes-National Starch and Chemical) having a pH of 9.5. Tablets were made in the aforedescribed manner with each tablet having a single seed of lettuce of the Calmar variety implanted therein. While the low (3.1) pH dextrin binders were dissolved in water in the manner hereinbefore indicated before being mixed with the vermiculite, the other binder materials were merely shaken with tap water until complete dissolution occurred. Otherwise, all of the tablets were made under identical conditions and in the manner hereinbefore described. Five replicates of tablets of each of the aforementioned binder formulations were planted in flats in a greenhouse and were subjected to daily watering. The results showed that the tablets having the lowest (3.1) pH dextrin binder had a higher percentage of plant emergence (95%) than the other tablets (avg.-89%). Even more significantly, the tablets with the lowest (3.1) pH dextrin binder provided earlier plant emergence as compared with the other tablets. The results of this test showed that, in general, high pH values in the binder material had a retarding effect upon plant emergence, and this effect particularly showed up in the fourth and fifth days after planting.

Another test was conducted with a series of seed tablets being made under similar conditions except for the binder material. The aforedescribed tablet of the present invention with a dextrin binder having a pH of 3.1 was compared with similar tablets using a Crystal Gum dextrin binder with a pH of 4.0, an Aqua Flakes dextrin binder with a pH of 9.2, two different types of polyvinyl acetate binders having pH's in the 4–7 range, an Aqua Flakes binder having a pH of 9.2, and a Kosol (National Starch and Chemical) modified starch binder having a pH of 6.0. The tablets each contained a single seed of lettuce of the Calmar variety and were made in accordance with the method disclosed in my aforementioned prior U.S. Pat. No. 3,555,730 at compression ratios of 6-1. The tablets were planted in the field with four replications of each different binder formulation being made. Those tablets having the dextrin binder with the low (3.1) pH clearly showed the highest percent plant emergence (98%), the tablets having the other binders having significantly lower percentages of plant emergence.

Finally, tests were run to determine whether the 3 1/2-1 compression ratio produced a seed tablet which would stand up under normal handling conditions. It was found that this compression ratio would produce an acceptable tablet only if the amount of water used in the initial formulation comprised at least approximately 12% of the total mixture by weight. With smaller amounts of water in the initial mixture, the strength of the tablet correspondingly decreased. For example, tablets made (at 3 1/2-1 compression ratio) with 8.3% moisture in the initial mix withstood an edge compression of only 9.3 pounds before crumbling while those tablets made in the aforedescribed formulation with 12% water in the initial mix (at 3 1/2-1 compression ratio) could withstand an edge compression of 13.7 pounds which is satisfactory for mechanical handling. While higher tablet compression ratios increased the amount of edge compression which the dried tablet could withstand and thereby provided higher strength tablets, such strength is not necessary for ordinary handling and planting purposes. Tests were conducted which clearly showed that the lower the compression ratio the higher the percentage of plant emergence. Therefore, the use of a relatively high percentage of water with a relatively low percentage of binder (in the ratios hereinbefore described) provides both a strong tablet and one with a high likelihood of plant emergence.

Accordingly, I have disclosed that the selection of a dextrin binder having a low pH value for the compressed vermiculite seed tablet of the present invention will provide a higher percentage of plant emergence than will be the case with seed tablets using other typical binder materials. Also, I have discovered that the use of a relatively small amount of binder material (less than 5% by weight) with an increased percentage of water (more than 12% by weight) in the initial tablet mix will provide a high strength tablet at a low compression ratio and that such low compression tablets have a higher percentage of plant emergence than do the higher compression ratio tablets of the prior art.

Although the best mode contemplated for carrying out the present invention has been herein shown and described, it will be apparent that modification and variation may be made without departing from what is regarded to be the subject matter of the invention.

What is claimed is:

1. A high strength seed tablet comprising one or more seeds encased in a mixture of dextrin binder with a pH value of about 3, vermiculite and water, the water content being at least about 12% by weight in the wet mixture, the ratio of vermiculite to binder being approximately 20:1, and the mixture being compressed about the said seed so that the original compressed mixture is reduced in volume by a factor of no more than 3 1/2-1.

* * * * *

UNITED STATES PATENT OFFICE
CERTIFICATE OF CORRECTION

PATENT NO. : 3,871,132

DATED : March 18, 1975

INVENTOR(S) : EDWIN H. BRINK, deceased

It is certified that error appears in the above-identified patent and that said Letters Patent are hereby corrected as shown below:

Column 4, line 38, delete "and".

Column 6, line 4, "handlng" should be --handling--.

Column 6, line 12, "disclosed" should be --discovered--.

Column 6, line 37, "compressed" should be --uncompressed--.

Signed and Sealed this thirtieth Day of December 1975

[SEAL]

Attest:

RUTH C. MASON
Attesting Officer

C. MARSHALL DANN
Commissioner of Patents and Trademarks